(12) United States Patent
Lauer

(10) Patent No.: US 7,967,977 B2
(45) Date of Patent: Jun. 28, 2011

(54) FILTER DEVICE

(75) Inventor: Viktor Lauer, Nalbach (DE)

(73) Assignee: Hydac Filtertechnik GmbH, Sulzbach/Saar (DE)

( * ) Notice: Subject to any disclaimer, the term of this patent is extended or adjusted under 35 U.S.C. 154(b) by 838 days.

(21) Appl. No.: 11/886,858

(22) PCT Filed: Feb. 16, 2006

(86) PCT No.: PCT/EP2006/001376
§ 371 (c)(1),
(2), (4) Date: Sep. 21, 2007

(87) PCT Pub. No.: WO2006/099922
PCT Pub. Date: Sep. 28, 2006

(65) Prior Publication Data
US 2009/0078623 A1 Mar. 26, 2009

(30) Foreign Application Priority Data
Mar. 24, 2005 (DE) .......................... 10 2005 013 672

(51) Int. Cl.
*B01D 35/00* (2006.01)
*B01D 24/08* (2006.01)
*B01D 24/10* (2006.01)
*B01D 24/48* (2006.01)
*B01D 27/00* (2006.01)

(52) U.S. Cl. ...... 210/91; 210/85; 210/416.4; 210/416.5; 210/435; 210/437; 210/440; 210/441; 210/443; 210/444; 210/450; 210/451; 210/457; 210/458; 210/472; 210/493.1; 210/493.2; 210/497.01

(58) Field of Classification Search ............ 210/DIG. 17
See application file for complete search history.

(56) References Cited

U.S. PATENT DOCUMENTS

| 4,654,140 | A |   | 3/1987 | Chen |
|---|---|---|---|---|
| 4,721,563 | A | * | 1/1988 | Rosaen ........................... 210/85 |
| 5,902,479 | A | * | 5/1999 | Fukumori et al. ............ 210/248 |
| 6,139,738 | A |   | 10/2000 | Maxwell |

FOREIGN PATENT DOCUMENTS

| DE | 88 10 529 | 10/1988 |
|---|---|---|
| DE | 196 23 681 | 12/1996 |
| DE | 196 44 646 | 4/1998 |
| DE | 199 51 085 | 4/2001 |
| DE | 299 21 543 U1 | 4/2001 |
| EP | 0 839 563 | 5/1998 |
| GB | 2 222 536 | 3/1990 |
| JP | 11104410 | 4/1999 |

* cited by examiner

*Primary Examiner* — Duane Smith
*Assistant Examiner* — Paul J. Durand
(74) *Attorney, Agent, or Firm* — Roylance, Abrams, Berdo & Goodman, LLP

(57) ABSTRACT

A filter device, especially a line filter forming part of hydraulic installations, includes a filter housing (1) that can be removed from a filter head and is used to receive a filter element (5) that separates a non-filtered side (13) from a filtered side (11) in a position in the filter housing for the operation of the filter. The filter device is provided with a display device (19, 21) signaling the absence or presence of the filter element (5) in the filter housing (1) in the operating position.

7 Claims, 4 Drawing Sheets

FILTER DEVICE

FIELD OF THE INVENTION

The present invention relates to a filter device, especially a line filter forming a component of hydraulic systems, with a filter housing. The housing can be removed from a filter head and is used to hold a filter element separating the unfiltered side from the filtered side when in the operating position for filter operation in the filter housing.

BACKGROUND OF THE INVENTION

Filter devices of this type are known, cf. *Der Hydrauliktrainer, Band* 1, 1991 [*Hydraulics Training Manual, Volume* 1, 1991], published by Mannesmann Rexroth GmbH, pp. 279 and 280. These filter devices can be designed for operation with spin-on cartridges. The filter cartridge contains a filter element permanently installed in the housing to be screwed onto the filter head. After expiration of the useful operating time of the filter element, it is replaced such that the entire cartridge with the used filter element contained therein being disposed of. On the other hand, filter devices such as these can also be operated in a design in which a filter housing interchangeably holds a filter element therein and is removably attached to the filter head so that when the filter element is changed, only the filter element is removed from the filter housing and disposed of. The filter housing provided with a new filter element continues to be used.

It is apparent that the latter design is comparatively more advantageous with respect to conservation of resources and the resulting operating costs due to the continued use of the filter housing. On the other hand, the design in which spin-on cartridges are used is characterized by especially high operating reliability, because the fixed installation of the filter element in the housing of the spin-on cartridge avoids the danger that in the course of replacement of a used filter element an empty filter housing without the fresh filter element inserted into it will be unintentionally attached to the filter head. On the other hand, in filter devices with a reusable filter housing serious damage or even destruction of the pertinent hydraulic system can occur if a filter housing without the filter element located therein is inadvertently attached to the filter head, for example through the carelessness of the operator only a used filter element being selected and insertion of a fresh element being omitted.

SUMMARY OF THE INVENTION

An object of the present invention is to provide a filter device avoiding the danger that the hydraulic system assigned to the device will be operated without a filter element in the filter housing.

According to the present invention, this object is basically achieved by a filter device having a display device indicating the presence or absence of the filter element located in the filter housing in the operating position. The danger of faulty operation of the filter device without an inserted filter element is then avoided. In this respect, a uniform measure of operating reliability is achieved, as is the case in the design in which spin-on cartridges are used, for which the filter element together with the cartridge housing containing it is replaced. In the present invention, the disadvantages of wasting material and the increased operating costs when using spin-on cartridges are avoided.

In preferred embodiments, the display device in the wall of the filter housing has an opening and a closing means. Depending on the absence or presence of a filter element in the operating position, that means can be moved into the open state clearing the opening or into a blocked state closing the opening. Closure or clearance of the opening then indicates the presence or absence of a filter element. Since as a result of the cleared opening of the filter housing fluid emerges from the filter housing when the filter device is operated without the filter element inserted, the fault state is immediately indicated and the pertinent hydraulic systems can be prevented from being operated in the fault state.

In one preferred embodiment the closing means has at least one closing body with at least one sealing element. In the operating position of the filter element, the sealing element forms a seal between the closing body and the opening. The closing body is formed by a bearing part of the filter element held in a seat of the filter housing in the operating position. Because in this connection the bearing part of the filter element interacts with the seat of the filter housing and acts as a closing body of the closing means, and thus, as a component of the display means, the design is especially simple, compact and economical.

The bearing part of the filter element can be advantageously formed by an extension on the end of its support tube bearing the filter material. In the operating position, the support tube is held in the seat of the filter housing, which seat is formed by a pipe socket-like depression in the bottom of the filter housing concentrically surrounding the opening. On the outside of the bearing part, the sealing element of the closing means interacts with the inside wall of the seat of the filter housing surrounding the opening to form a seal.

Since in filter operation axial forces acting in the direction of the longitudinal axis of the support tube can occur on the filter element, it is advantageous to safeguard the bearing part formed by the axial extension of the support tube against lifting caused by axial forces out of the seat of the filter housing. For this purpose the bearing part of the support tube can have a hole with an inside thread flush with the opening of the filter housing in the operating position. The bearing part and the filter element can then be axially locked in the filter housing by a retaining screw extending through the opening of the filter housing.

This hole of the bearing part can be made continuous into the interior of the support tube, that is, as far as the filtered side. The closing means has another sealing element sealing the edge of the opening on the outside of the filter housing relative to the head of the retaining screw. In this way even when the filter element is in the operating position, if necessary, the filtered side can be emptied by loosening the retaining screw and taking it out of the hole.

In one development of such an embodiment, the bearing part can have at least one connecting channel enabling a connection between the continuous hole and the unfiltered side in the filter housing. The channel can be closed by the unthreaded shaft section and can be cleared by unscrewing the retaining screw. This arrangement also enables emptying of both the filtered side and the unfiltered side as needed when the filter element is in the operating position.

If in this embodiment a partial segment of the hole passing through the bearing part has a widening forming a fluid passage between the end region facing the opening of the filter housing and the region of the hole closable by the unthreaded shaft section of the retaining screw, for purposes of emptying of both the filtered side and the unfiltered side with the filter element in the operating position the retaining screw need simply be loosened, but not removed entirely from the hole.

The retaining screw can have an inner longitudinal channel open on its end facing the interior of the filter housing and opened by a transverse outlet on its opposite end in the shaft region adjoining the sealing element sealing the head of the retaining screw. In this case as well, without having to remove the retaining screw completely from the hole, the filtered side and the unfiltered side can be emptied when the filter element is in the operating position.

To ensure that the unscrewed retaining screw remains captively on the filter housing, the head of the retaining screw on the end facing away from the shaft can have a driving part with radially extending driver blades. The driver blades are guided in a rotary cage supported on the filter housing to be rotatable and axially nondisplaceable around the axis of the screw in a guide. The guide has stops for transmission of the torque to the screw. At least one stop limits the axial motion of the screw when it is loosened.

The subject matter of the present invention is also a filter element for the device.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
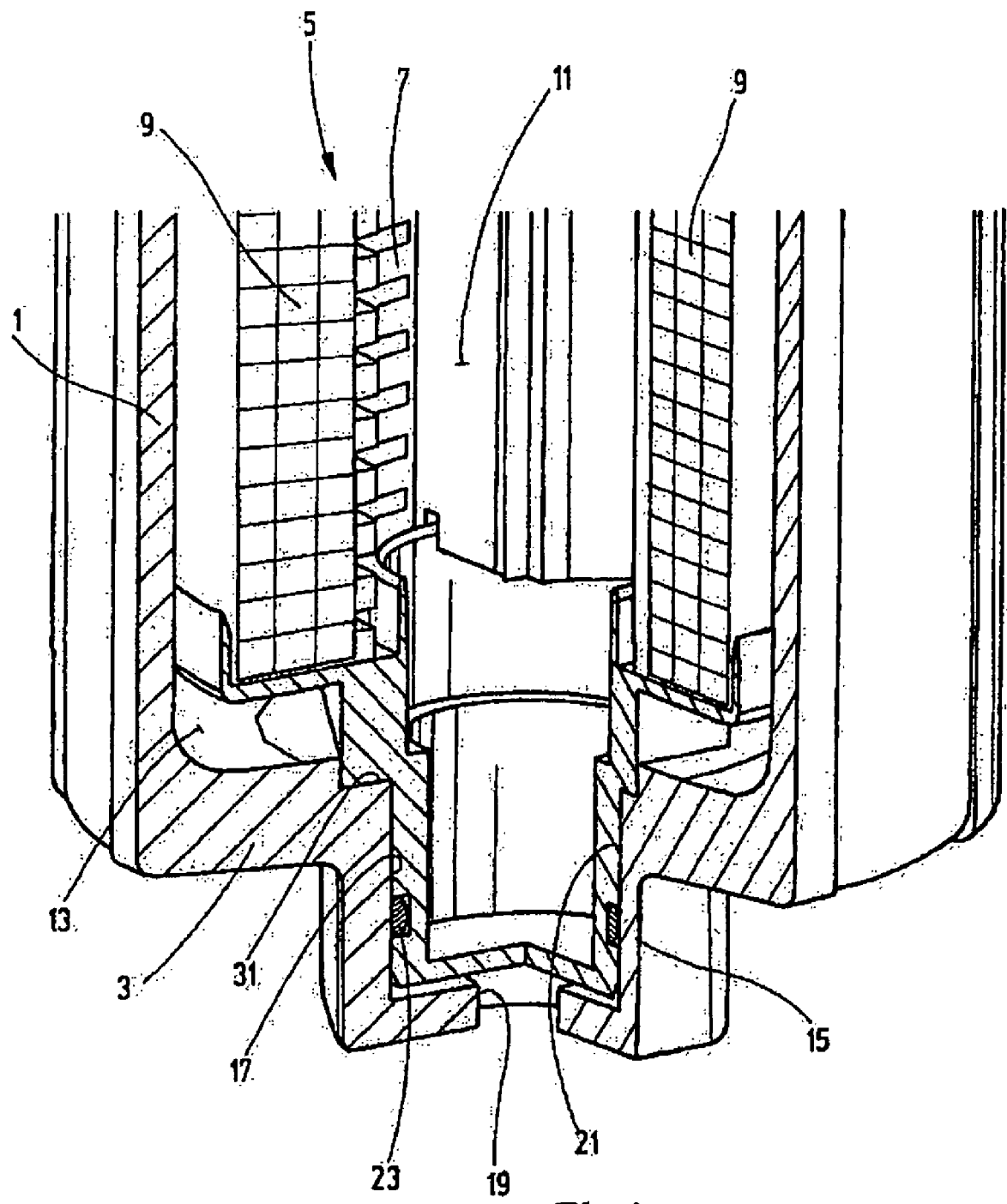
FIG. 1 is a cutaway perspective view, showing only the lower partial region of a filter device according to a first exemplary embodiment of the present invention, cut with cutting planes in the longitudinal direction of the filter housing and at a right angle to one another.

A filter housing 1, of which in the figures only the region adjacent to the housing bottom 3 is shown, can be connected in the conventional manner for these filter devices with its end (not shown) open to the top to a filter head, for example by screwing it in. The filter head has connections for feed and discharge of the fluid to be filtered and optional accessories, for example a connection for clogging indicators and the like. In the interior of the filter housing 1 shaped to be circularly cylindrical over a large part of its length, a filter element 5 can be held as shown in its operating position. The filter element 5 has a fluid-permeable support tube 7 surrounded by the filter material 9. The upper end (not shown) of the support tube 7 is tightly connected on the filter head to the outlet for the filtered fluid. The fluid to be filtered travels from the feed of the filter head to the outside of the filter material 9. The interior of the support tube 7 in filter operation forms the filtered side 11, while the space surrounding the filter material 9 within the filter housing 1 forms the unfiltered side 13.

As the seat in which the filter element 5 in its operating position is held within the filter housing 1, the bottom 3 of the filter housing 1 has a centrally located, pipe socket-shaped depression 15 with an inside wall 17 concentric to the opening 19. Opening 19 is centrally positioned on the base of the depression 15 and is flush with the longitudinal axis of the support tube 7.

A metallic extension of the support tube 7 projecting on the lower end of the support tube 7 concentrically to its longitudinal axis forms a circularly cylindrical bearing part 21. The bearing part 21 in the operating position of the filter element 5 is held in a depression 15 forming the seat. A sealing element 23 sits on the outside of the bearing part 21 in an annular groove sealing the bearing part 21 relative to the inside wall 17 of the depression 15, and thus; relative to the opening 19 located on the base of the depression 15. The bearing part 21 forms a closing means or closure blocking discharge of fluid from the unfiltered side 13 out of the opening 19 when the filter element 5 is in the operating position. Since the bearing part 21 seals the lower end of the support tube 7 fluid-tight, fluid cannot emerge from the filtered side via the opening 19. On the other hand, the opening 19 is opened when a filter element 5 is not present. With improper start-up with the filter element 5 missing, this impermissible operating state is indicated by escape of fluid through the opening 19.

Figure 2:
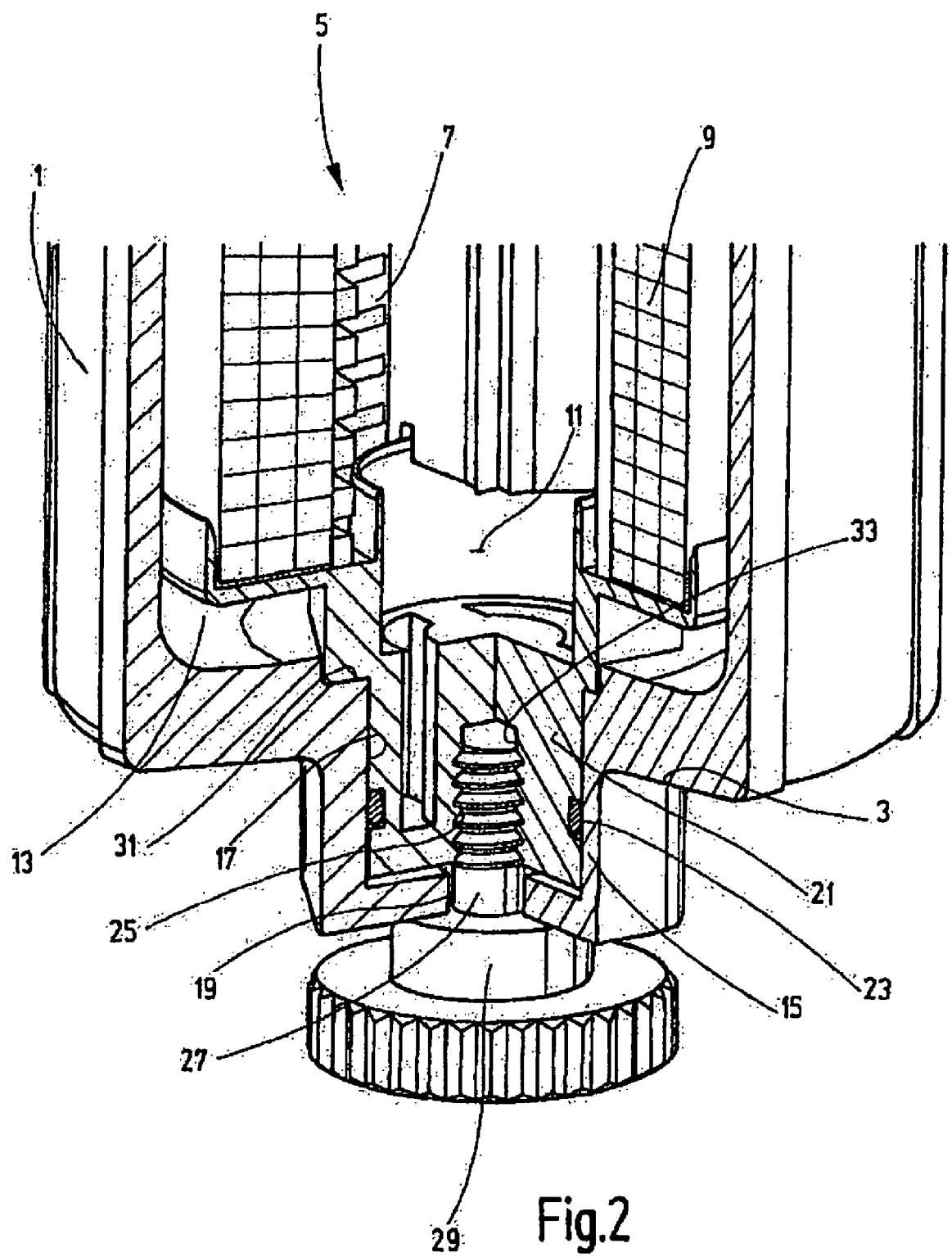
FIG. 2 is a cutaway perspective view showing only the lower partial region of a filter device according to a second exemplary embodiment of the present invention.

The embodiment of FIG. 2 differs from the embodiment of FIG. 1 simply in that the bearing part 21 of the filter element 5 is not made entirely as a hollow body having only a thin-walled bottom. The bearing part 21 of FIG. 2 has an internal solid core in which a hole 33 with an inside thread 25 is formed into which a retaining screw 27 can be screwed. Retaining screw 27 has a head 29 adjoining the outside of the housing. The retaining screw 27 safeguards the bearing part 21 and thus the filter element 5 in the operating position against axial forces which could occur in filtering operations on the filter element 5. An annular shoulder 31 projecting radially on the bearing part 21 in contact with the assigned stop surface formed by a radial widening on the inside wall 17 of the depression 15 is safeguarded or secured.

Figure 3:
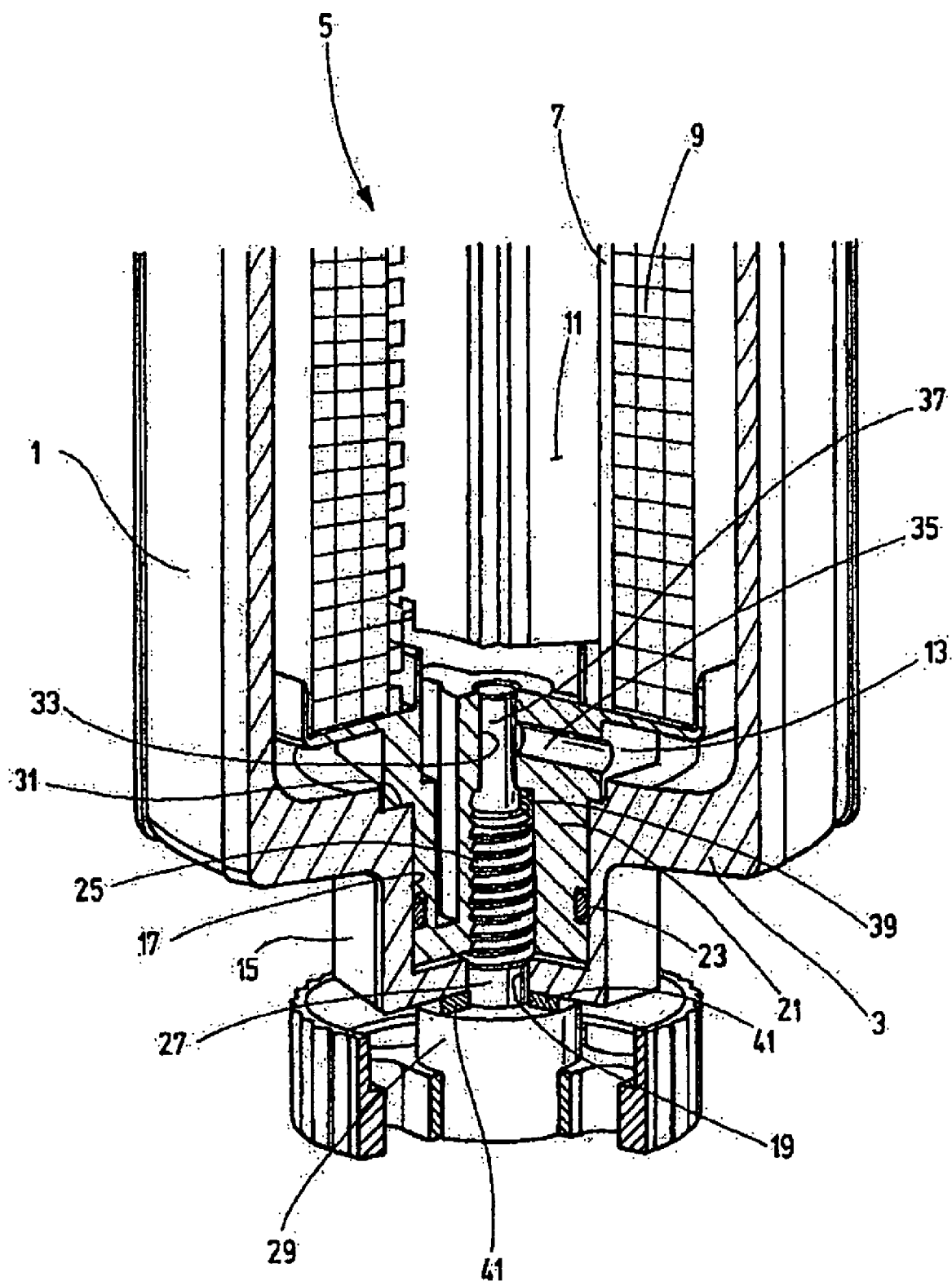
FIG. 3 is a cutaway perspective view showing only the lower partial region of a filter device according to a third exemplary embodiment of the present invention.

In contrast to the example of FIG. 2, the FIG. 3 bearing part 21 of the filter element 5 has a through hole 33 via which a fluid connection between the filtered side 11 within the support tube 7 and the opening 19 on the base of the depression 15 can be produced when the filter element 5 is in the operating position. Moreover, the connecting channel 35 extending crosswise in the bearing part 21 connects the hole 33 to the unfiltered side 13 within the filter housing 1. The hole 33 then enables the unfiltered side 13 to be emptied when the filter element 5 is in the operating position. As seen in FIG. 3, the retaining screw 27 provided in this embodiment has an end-side, unthreaded shaft section 37 closing the inner end of the connecting channel 35 when the retaining screw 27 is screwed in tight as shown in FIG. 3. As likewise seen in FIG. 3, the hole 33 on the longitudinal segment proceeding from the free end of the bearing part 21 has a widening 39 in the form of a groove interrupting the inner thread 25 only on a small peripheral segment and enabling a fluid connection via the hole 33 to the housing opening 19 even when the retaining screw 27 has not been completely unscrewed from the hole 33, that is, when there is still engagement with the end region of the inner thread 25. With the filter element 5 in the operating position and with the retaining screw 27 partially screwed out, the opening 19 is no longer sealed by another sealing element 41 which, when the retaining screw 27 has been tightened, seals its screw head 29 relative to the outside edge of the opening 19. The filtered side 11 and the unfiltered side 13 can then be emptied as soon as the retaining screw 27 has been unscrewed so far that its unthreaded shaft section 37 moves into the region of the widening 39 of the hole. In any case, the retaining screw 27 can be completely unscrewed, i.e., removed. As in the examples of FIGS. 1 and 2, when no filter element 5 is in the filter housing 1, the housing opening 19 is not closed so that in turn possible faulty operation is indicated by escape of fluid from the filter housing 1.

Figure 4:
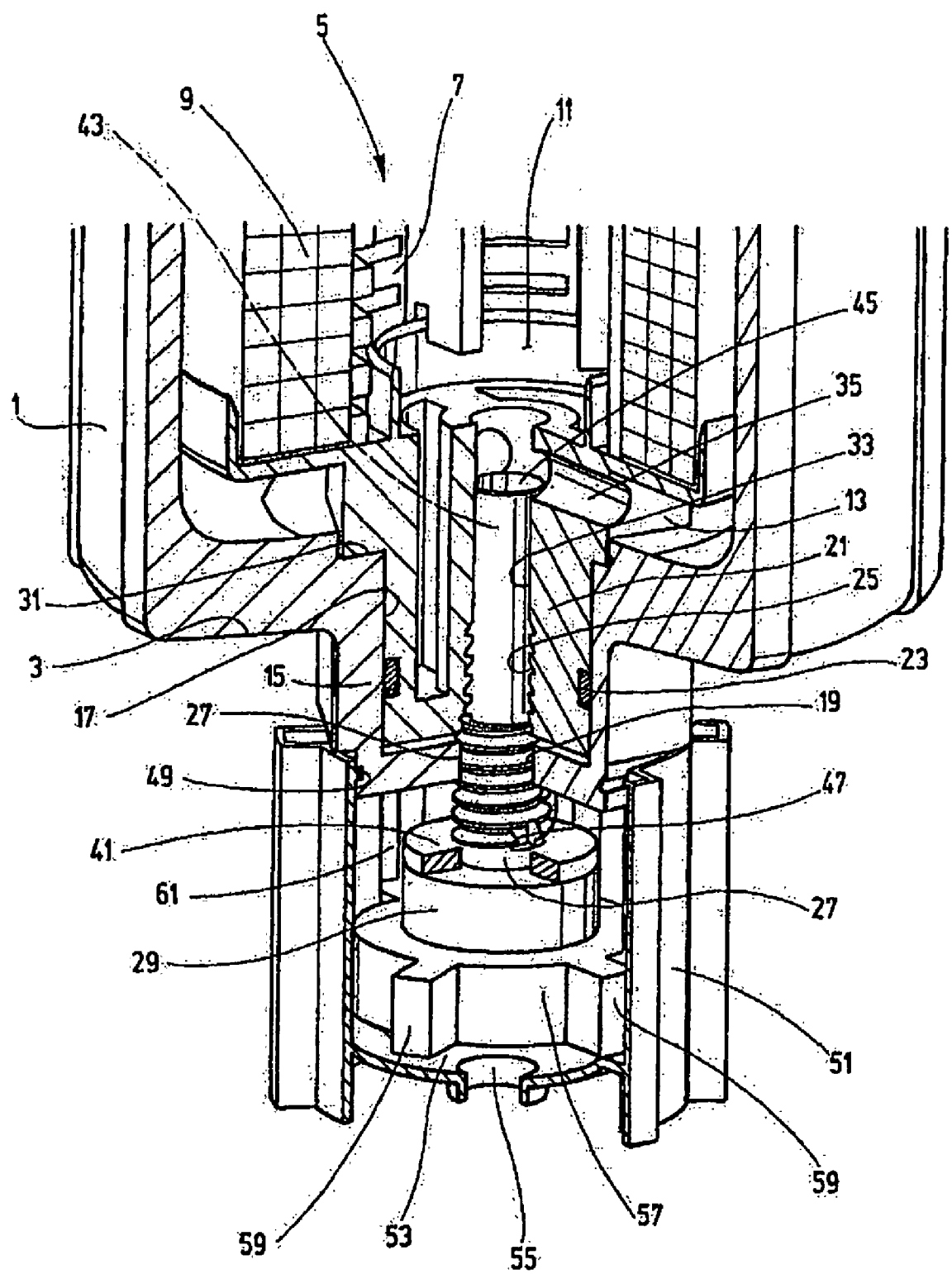
FIG. 4 is a cutaway perspective view showing only the lower partial region of a filter device according to a fourth exemplary embodiment of the present invention.

The example of FIG. 4 differs from the example of FIG. 3 in two respects. FIG. 4 shows the filter element 5 in its operating position, but with the retaining screw 27 partially unscrewed. The first major difference relative to the example of FIG. 3 involves the retaining screw 27 having an inner longitudinal channel 43 extending from the free shaft end 45 up to a transverse outlet 47 located at a location of the shaft of the screw 27 adjacent to the sealing element 41. Sealing element 41 forms a seal between the screw head 29 and the outside of the housing on or about the opening 19, with the screw 27 tightened. In the operating state shown in FIG. 4 with the screw 27 partially released, although the filter element 5 is in the operating position, both the filtered side 11 and the unfiltered side 13 can be emptied via the connecting channel 35, the inner channel 43 of the screw and its transverse outlet 47. As in the other embodiments, when the filter element 5 is missing in the filter housing 1, the housing opening 19 cannot be closed so that a faulty operating state is indicated in turn by escape of the fluid.

The second fundamental difference of the example of FIG. 4 relative to the example of FIG. 3 is that the retaining screw 27 is captively secured. For this purpose, on the lower end of the housing depression 15 a rotary cage 51 is secured by a snap connection in an annular groove 49, is in the form of a cap-like molded piece, preferably of plastic, and on the end facing away from the snap connection has a bottom 53 with an outlet opening 55. The head 29 of the retaining screw 27 on the end side has a driving part 57 with radially projecting driver blades 59 engaging the inner guides 61 of the cage 51. Driver blades 59 are guided to be axially displaceable in guides 61, but are nonrotatable. The bottom 53 of the cage forms a stop limiting the axial motion of the retaining screw 27 when being screwed out. The screw 27 can then be screwed out only to the extent that engagement of the thread with the inside thread 25 of the hole 33 is cancelled so that the filter element 5 can be removed from the filter housing 1 and a fresh filter element 5 can be inserted into the operating position. As shown in FIG. 4, when the filter element 5 is in the operating position, both the filtered side 11 and the unfiltered side 13 can be emptied via the partially unscrewed screw 27, with the screw 27 being held captively on the housing by the rotary cage 51.

As in the preceding examples, fluid-tight closure of the housing opening 19 is possible only when the filter element 5 is in the operating position so that faulty operation is indicated in turn by the fluid's running or flowing out.

While various embodiments have been chosen to illustrate the invention, it will be understood by those skilled in the art that various changes and modifications can be made therein without departing from the scope of the invention as defined in the appended claims.

What is claimed is:

1. A filter device for hydraulic systems, comprising:
   a filter housing removably couplable to a filter head;
   a filter element removably received in said filter housing in an operating position for a filtering operation and separating an unfiltered side and a filtered side in said filter housing;
   a display device indicating a presence or an absence of said filter element in the operating position in said filter housing, said display device having an opening in a wall of said filter housing and a closure blocking said opening when said filter element is in the operating position in said filter housing to indicate the presence of said filter element and clearing said opening when said filter element is absent from said filter housing to indicate the absence of said filter element, said closure having at least one closing body with a sealing element on an outside surface thereof forming a seal between said closing body and said opening when said filter element is in the operating position, said closing part being formed by a bearing part of said filter element, said bearing part being accommodated in a seat of said filter housing in the operating position, said seat being formed by a pipe-shaped depression in a base of said filter housing surrounding said opening concentrically and having an inner wall engaged by said sealing element in the operating position; and
   a support pipe supporting filter material of said filter element, said bearing part being an extension on one end of said support pipe.

2. A filter device according to claim 1 wherein
   said bearing part comprises a hole with an internal thread flush with said opening in the operating position; and
   said bearing part and said filter element are securable axially in said filter housing by a retaining screw extending through said opening.

3. A filter device according to claim 2 wherein
   said retaining screw comprises a drive part on an end of a head of said retaining screw remote from a shaft of said retaining screw, said drive part having radially extending driver blades; and
   a rotary cage rotatably supported on said filter housing without relative axial displacement of said filter housing and said rotary cage and guiding said driver blades, said rotary cage having guides with stops transmitting torque to said retaining screw, at least one of said stops limiting axial motion of said retaining screw when unthreading.

4. A filter device according to claim 2 wherein
   said hole of said bearing part extends continuously to an inside of said support pipe; and
   said closure has an additional sealing element securing an edge of said opening on an outside of said filter housing relative to a head of said retaining screw.

5. A filter device according to claim 4 wherein
   said bearing part comprises at least one connecting channel enabling fluid communication between said hole and said unfiltered side within said filter housing; and
   said retaining screw comprises an unthreaded shaft section clearing said connecting channel by unthreading said retaining screw.

6. A filter device according to claim 5 wherein
   a partial section of said hole in said bearing part comprises a widening forming a fluid passage between an end region facing said opening and a region of said hole closable by said unthreaded shaft section of said retaining screw.

7. A filter device according to claim 5 wherein said retaining screw comprises an inner longitudinal channel open on an end thereof facing an inside of said filter housing and opened by a lateral outlet on an opposite end thereof in a shaft region adjoining said additional sealing element.

* * * * *